(12) United States Patent
Rider et al.

(10) Patent No.: US 8,125,177 B2
(45) Date of Patent: Feb. 28, 2012

(54) SYSTEM AND METHOD FOR ADDING VOLTAGES OF POWER MODULES IN VARIABLE FREQUENCY DRIVES

(75) Inventors: Jerald R. Rider, Catoosa, OK (US); John M. Leuthen, Claremore, OK (US); Jim E. Layton, Chelsea, OK (US); Dick L. Knox, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 451 days.

(21) Appl. No.: 12/476,099

(22) Filed: Jun. 1, 2009

(65) Prior Publication Data
US 2009/0309524 A1    Dec. 17, 2009

Related U.S. Application Data

(60) Provisional application No. 61/061,468, filed on Jun. 13, 2008.

(51) Int. Cl.
*H02P 27/04* (2006.01)
(52) U.S. Cl. .................. 318/801; 318/109
(58) Field of Classification Search ............ None
See application file for complete search history.

(56) References Cited

U.S. PATENT DOCUMENTS

| | | | |
|---|---|---|---|
| 5,625,545 A | 4/1997 | Hammond | |
| 6,072,707 A | 6/2000 | Hochgraf | |
| 6,697,271 B2 | 2/2004 | Corzine | |
| 7,088,073 B2 | 8/2006 | Morishita | |
| 7,307,400 B2 | 12/2007 | Rastogi | |
| 7,778,045 B2 * | 8/2010 | Alexander | 363/13 |
| 8,008,885 B2 * | 8/2011 | Jones et al. | 318/800 |
| 2006/0196203 A1 * | 9/2006 | Schnetzka et al. | 62/228.4 |
| 2006/0274560 A1 | 12/2006 | Rastogi | |
| 2007/0035261 A1 | 2/2007 | Amorino | |
| 2007/0046252 A1 | 3/2007 | Aiello | |
| 2007/0109823 A1 | 5/2007 | Rastogi | |
| 2008/0284369 A1 * | 11/2008 | Jones et al. | 318/722 |
| 2009/0051307 A1 * | 2/2009 | Katsuyama et al. | 318/472 |

FOREIGN PATENT DOCUMENTS

| | | |
|---|---|---|
| EP | 0536876 | 4/1993 |
| GB | 2394845 | 5/2004 |
| WO | WO-02/19495 | 3/2002 |
| WO | WO-2006/124868 | 11/2006 |

\* cited by examiner

*Primary Examiner* — Mark Budd
(74) *Attorney, Agent, or Firm* — Law Offices of Mark L. Berrier

(57) ABSTRACT

Systems and methods for providing electrical power and to downhole oil production equipment such as electrical submersible pumps, wherein the outputs of multiple power modules are individually filtered before being added together to obtain a high voltage output that is provided to the downhole equipment. In one embodiment, an electrical drive system includes multiple power modules and corresponding filters. Each of the power modules is configured to receive an input power signal and to provide a corresponding pulse width modulated or stepped intermediate signal. The signal output by each power module is individually filtered to remove at least a portion of high-frequency components in the signal. The power modules and filters are coupled together in a configuration in which the filtered signals of the power modules are added to produce an output drive signal that is used to drive equipment such as an electrical submersible pump.

20 Claims, 4 Drawing Sheets

SYSTEM AND METHOD FOR ADDING VOLTAGES OF POWER MODULES IN VARIABLE FREQUENCY DRIVES

CROSS-REFERENCE TO RELATED APPLICATIONS

This application claims the benefit of U.S. Provisional Patent Application 61/061,468, filed Jun. 13, 2008, which is incorporated by reference as if set forth herein in its entirety.

BACKGROUND

1. Field of the Invention

The invention relates generally to electrical control systems, and more particularly to systems and methods for providing electrical power to downhole oil production equipment such as electrical submersible pumps.

2. Related Art

Electric submersible pumps are typically used to pump crude oil out of wells that may be thousands of feet deep. These pumps are driven by power systems that are at the surface of the wells and are connected to the pumps by thousands of feet of electrical cable. The power systems may, for example, include variable speed drives that can control the speed of the pump motors and thereby control the speed at which the oil is pumped out of the wells.

A variable speed drive normally receives low-to-medium-voltage AC power, converts the AC power to DC which charges a capacitor bank, and then draws energy from the capacitor bank to produce the desired high-voltage AC output power that is supplied to the pump motor. Step-up transformers were initially used to convert relatively low inverter output voltages to the higher desired voltages but, more recently, systems have been developed which utilize power cells or modules that are connected in series to directly generate the high-voltage output.

The output of a variable speed drive for an electric submersible pump is typically a PWM (pulse width modulated) signal. A PWM signal is a square wave that has pulses of varying widths. The widths of the pulses are modulated to achieve a desired duty cycle for each pulse. By varying the duty cycle over time, the output voltage of the PWM signal can approximate a desired waveform, such as a sinusoidal waveform. In systems which use serially connected power cells to generate high output voltages, the output voltages of the power cells may be added to create a stepped waveform, rather than a simple binary (on-off) waveform.

Systems that have serially connected power cells may be designed so that the switching of each of the serially connected power cells is staggered in time with respect to the other power cells to which it is serially connected (see, e.g., U.S. Pat. No. 5,625,545 to Hammond.) By staggering the switching times of the cells, the harmonic components of the output voltage can be reduced. Also, because the maximum output voltage is reached in several steps, rather than a single step, the rate of rise (dv/dt) of the voltage signal is less than if the maximum voltage where reached in a single step, so less noise is generated and there is less overshoot of the maximum voltage at the pump motor.

There may, however, be circumstances in which it is desirable to use serially connected power cells that have switching times which are not staggered. In a system such as this, the maximum output voltage is reached in a single step. The rate of rise of the output voltage signal in this case is much larger than if the maximum voltage where reached in multiple steps, causing more noise and more overshoot of the maximum voltage at the pump motor. Because the noise and overshoot are undesirable and potentially harmful to the pump motor, it would be desirable to provide systems and methods for reducing these effects of switching in the power cells.

SUMMARY OF THE INVENTION

This disclosure is directed to systems and methods for providing electrical power and to downhole oil production equipment such as electrical submersible pumps, wherein the outputs of multiple power modules are individually filtered before being added together to obtain a high voltage output that is provided to the downhole equipment.

In one particular embodiment, an electrical drive system configured to drive an electrical submersible pump motor includes multiple power modules and corresponding filters. Each of the power modules is configured to receive an input power signal and to provide a corresponding output power signal. The output power signal of each power module is filtered to remove at least a portion of high-frequency components in the output power signal. The power modules and filters are coupled together in a configuration in which the filtered output power signals are added to produce an output drive signal that is used to drive equipment such as an electrical submersible pump.

In one embodiment, the drive system includes three separate sets of modules and filters, where each set produces a substantially sinusoidal high-voltage output at a different phase. These output signals are then combined to produce a three-phase high-voltage drive output signal that is provided to drive the pump motor. The filters in this embodiment may be LC filters, simple inductors, or other types of low-pass filters. The power modules may have structures similar to larger drive systems which include a converter section, capacitor bank and inverter section. The power modules may produce PWM or stepped output signals (before filtering). The drive system may be incorporated into a production system that includes not only the drive, but also the pump and interconnecting cable that carries the drive signal to the pump motor.

Another embodiment comprises a method for producing a high-voltage drive output signal for an electrical submersible pump motor. The method includes providing a plurality of intermediate-voltage drive signals, individually filtering each of these signals to remove at least a portion of their high-frequency components, and adding the filtered signals to produce a high-voltage drive output signal. The intermediate-voltage drive signals, which may be PWM signals, are each passed through an LC filter or other type of low-pass filter before being added together to produce the higher-voltage drive output signal. The resulting drive output signal may be sinusoidal in each of its phases, or it may simply have less high-frequency components than the intermediate (e.g., PWM) signals.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
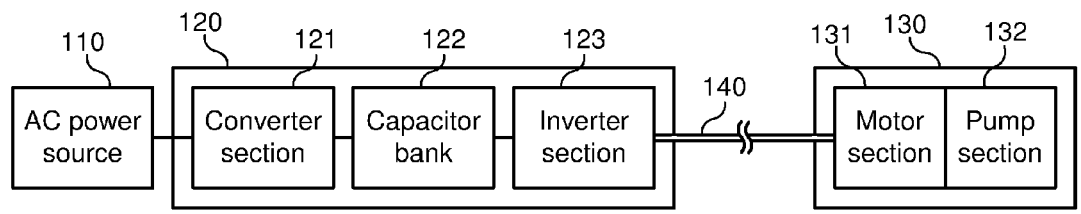
FIG. 1 is a functional block diagram illustrating the structure of a typical pump system in accordance with the prior art.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing electrical power and to downhole oil production equipment such as electrical submersible pumps, wherein the outputs of multiple power modules are individually filtered before being added together to obtain a high voltage output that is provided to the downhole equipment.

In one embodiment, a variable speed drive is coupled to an electric submersible pump. The variable speed drive is located at the surface and is connected by an electrical cable to the electric submersible pump, which is located in the well. The variable speed drive receives power at an AC line voltage, converts the power to a three-phase drive output signal, and provides this signal to the pump's motor to drive the pump, thereby producing fluid (e.g., oil) from the well.

The variable speed drive includes multiple power modules, each of which receives the line voltage and converts this to an intermediate power signal, which is typically a PWM signal. The intermediate signal produced by each of the power modules is individually filtered by a corresponding low pass filter, such as an LC filter, to produce a substantially sinusoidal signal at an intermediate voltage. The intermediate-voltage signals produced by the power modules are then added to produce a high-voltage signal that can be output by the variable speed drive to drive the electric submersible pump. In this embodiment, the power modules are divided into three sets, and each set of power modules is configured to produce a high-voltage signal with a different phase. These three signals are then added to produce a three-phase, high-voltage drive output signal.

Because the outputs of the power modules are individually filtered before they are added together, electrical stresses on the filter components are substantially reduced. This may reduce the cost and complexity of the filters, while allowing the drive to produce a drive output signal that has few high-frequency components that can cause voltage overshoot and high electrical stresses at the pump motor.

Referring to FIG. 1, a functional block diagram illustrating the structure of a typical pump system is shown. The system includes an AC power source 110, a variable speed drive 120 and a electric submersible pump 130. AC power source 110 is typically a three-phase, 50-60 Hz, 4160 V power source. The three-phase power from source 110 is provided to the converter section 121 of variable speed drive 120. Converter section 121 converts the AC power to DC, and the output of the converter section charges a capacitor bank 122. Capacitor bank 122 provides DC power to an inverter section 123 of the drive. Inverter section 123 draws energy from the capacitor bank and produces an output voltage which is used to drive electric submersible pump 130. The output voltage of variable speed drive 120 is transmitted to pump 130 via cable 140 and is used to power the motor section 131 of the pump. Motor section 131 then drives, section 132 to pump fluid out of the well.

Figure 2A:
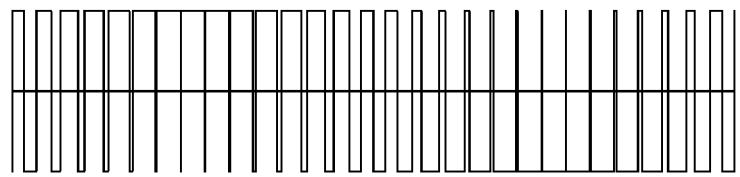
FIGS. 2A-2C are diagrams illustrating various possible waveforms that can be output by a drive for an electric submersible pump.
Figure 2B:
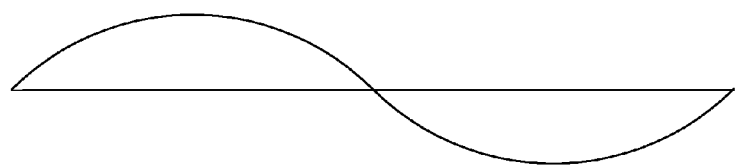
Figure 2C:
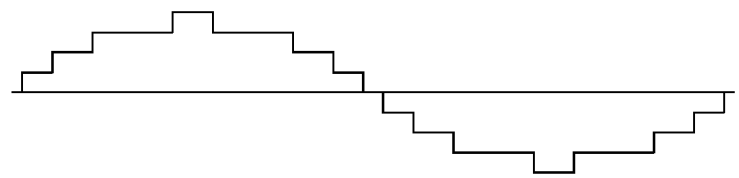

As mentioned above, it is typical for the output of a variable speed drive to be a pulse width modulated (PWM) signal. Referring to FIG. 2A, a simple binary PWM output signal is illustrated. The PWM output signal of FIG. 2A approximates the power output of the sinusoidal waveform shown in FIG. 2B. It can be seen that the width of the positive pulses in the PWM signal have a maximum pulse width corresponding to the peak of the sinusoidal waveform, and the width of the positive pulses in the PWM signal have a minimum pulse width corresponding to the valley of the sinusoidal waveform. In some systems, the output signal of the variable speed drive may be more complicated, as illustrated by the stepped waveform of FIG. 2C.

The rapid voltage changes in the PWM output waveforms (both the binary waveform and the stepped waveform) can cause a great deal of noise, and cause the pump motor to run inefficiently. When a number of power modules are serially connected to produce a higher output voltage, the noise and its effects are even more pronounced. Also, because cable 140 is very long, rapid changes in the drive's output voltage (high dv/dt) may cause overshoot at the pump motor. In other words, if the drive's output voltage changes rapidly from a first voltage to a second voltage, the actual voltage seen by the motor will typically begin changing from the first voltage to the second voltage and then overshoot the second voltage, rather than stopping at the second voltage. As a result, the peak voltage experienced at the motor will often be greater than the peak voltage output by the drive. Thus, the rapid rate of rise of a square PWM waveform will typically cause the peak voltage at the motor to be 4-5 times that output by the drive.

Conventionally, this problem is addressed by filtering the output of the drive. This solution may be difficult or costly to implement, however, because of the high voltage that is being filtered. A typical drive produces an output that may be as high as 8000 volts. Filtering this output requires very costly components, and the rapid voltage changes in the PWM signals can place a great deal of stress on the components which may increase the likelihood that the components will fail.

Figure 3:
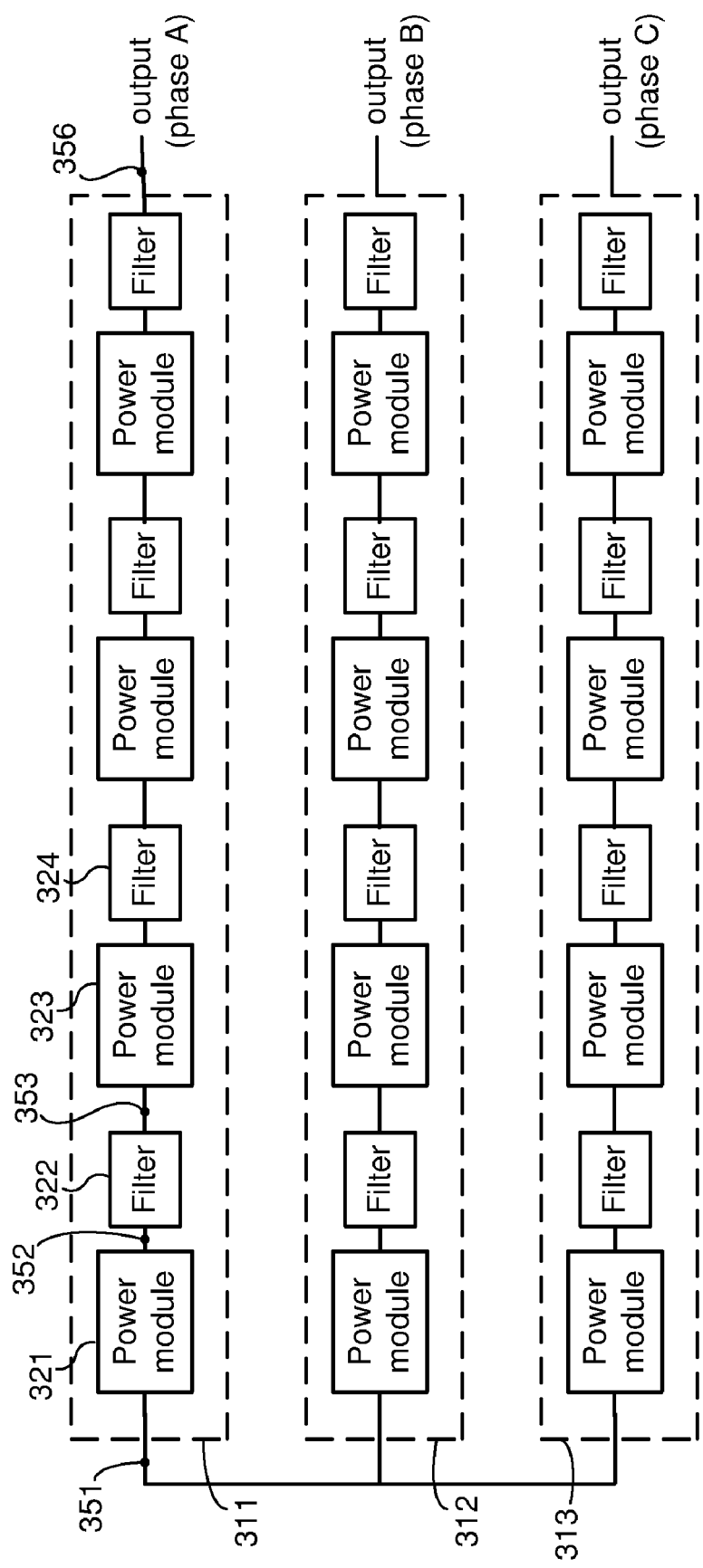
FIG. 3 is a block diagram illustrating the structure of a variable speed drive in accordance with one embodiment.

Referring to FIG. 3, a block diagram illustrating the structure of a variable speed drive in accordance with one embodiment of the invention is shown. In this embodiment, the drive includes three sets (311-313) of power modules. Each of the power modules has a filter coupled to its outputs. For example, the output of power module 321 is filtered by filter 322, the output of power module 323 is filtered by filter 324, and so on. Each serially connected set of power modules (311-313) produces an output voltage with a corresponding phase. In this example, power module set 311 produces an output voltage at phase A, set 312 produces a voltage at phase B, and set 313 produces a voltage at phase C.

The filter coupled to each power module is designed to remove the high-frequency components of the square PWM waveform produced by the power module and pass a lower-frequency signal to the next power module. The filter may, for example, be as simple as an inductor connected to the output of the power module. The filter may alternatively be an LC (inductor-capacitor) filter, or an even more complex filter, depending upon the requirements placed on the system. A simpler filter such as an inductor will reduce high-frequency components of the voltage output by the power module, but may not be sufficient to pass only the fundamental sinusoidal waveform. The filter will nevertheless reduce the magnitude of the voltage change (dv/dt) in the output, which will in turn reduce the peak voltage seen at the pump motor and reduce the stress on the motor and system components.

More complex filters, such as LC filters, will typically reduce more of the unwanted high-frequency components of the power module output. Ideally, the filter will pass only the fundamental sine wave component of the output. Because the power modules are connected in series, with the output of each module being filtered, the output of the serially connected set is a sine wave (the sum of the filtered outputs—sine waves—of the individual power modules) rather than a square or stepped waveform (which would be the result of summing the unfiltered outputs of the modules.)

Figure 4A:
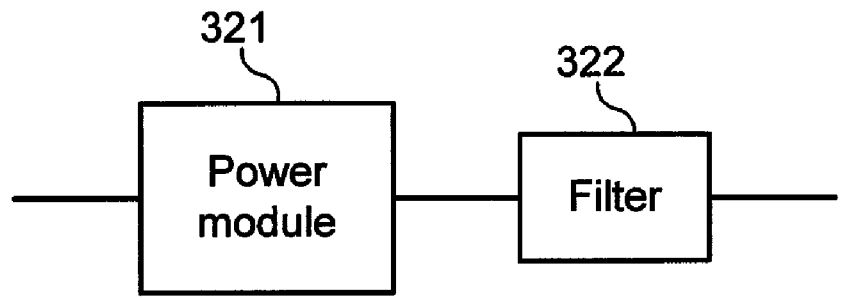
FIGS. 4A-4C are a set of diagrams illustrating various filters that may be used in alternative embodiments of the invention.
Figure 4B:
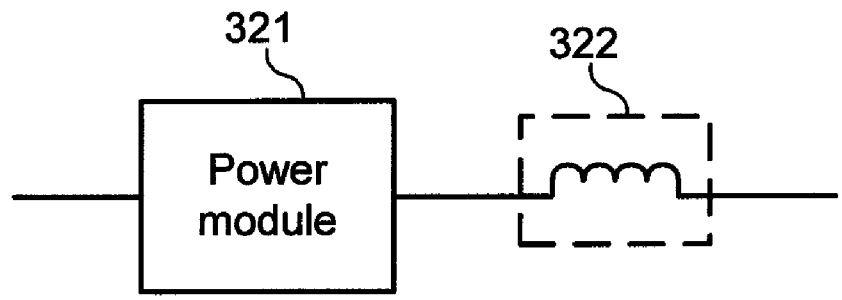
Figure 4C:
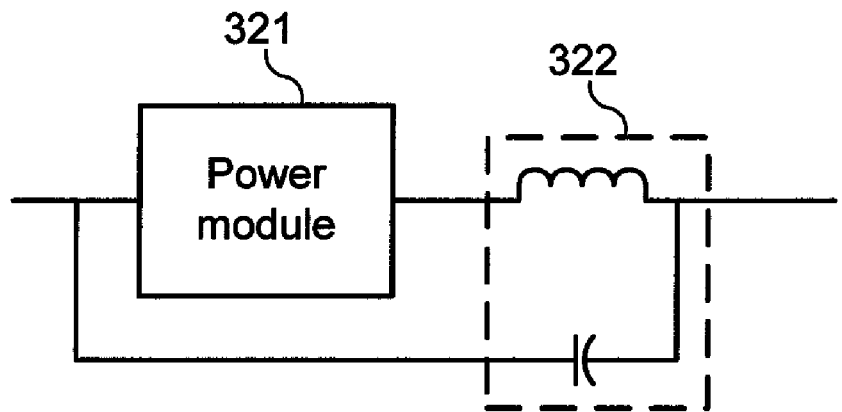

Referring to FIGS. 4A-4C, a set of diagrams illustrating various filters suitable for implementation in embodiments of the present invention are shown. FIG. 4A shows a power module-filter pair (321, 322) from the system of FIG. 3. It is anticipated that each power module-filter pair in the system will have the same structure, although this is not necessary, and alternative embodiments may implement power modules or filters that have different structures.

Referring to FIG. 4B, filter 322 is implemented as a simple inductor that is positioned in series with the power module. Thus, in the system of FIG. 3, each set of power modules would have an inductor between it and the next power module. An inductor would also be placed between the last power module and the output. Referring to FIG. 4C, filter 322 is implemented as an LC filter. The inductor of the filter is positioned between power modules as in FIG. 4B, while the capacitor of the filter is placed between the positive and negative terminals of the power module.

Figure 5:
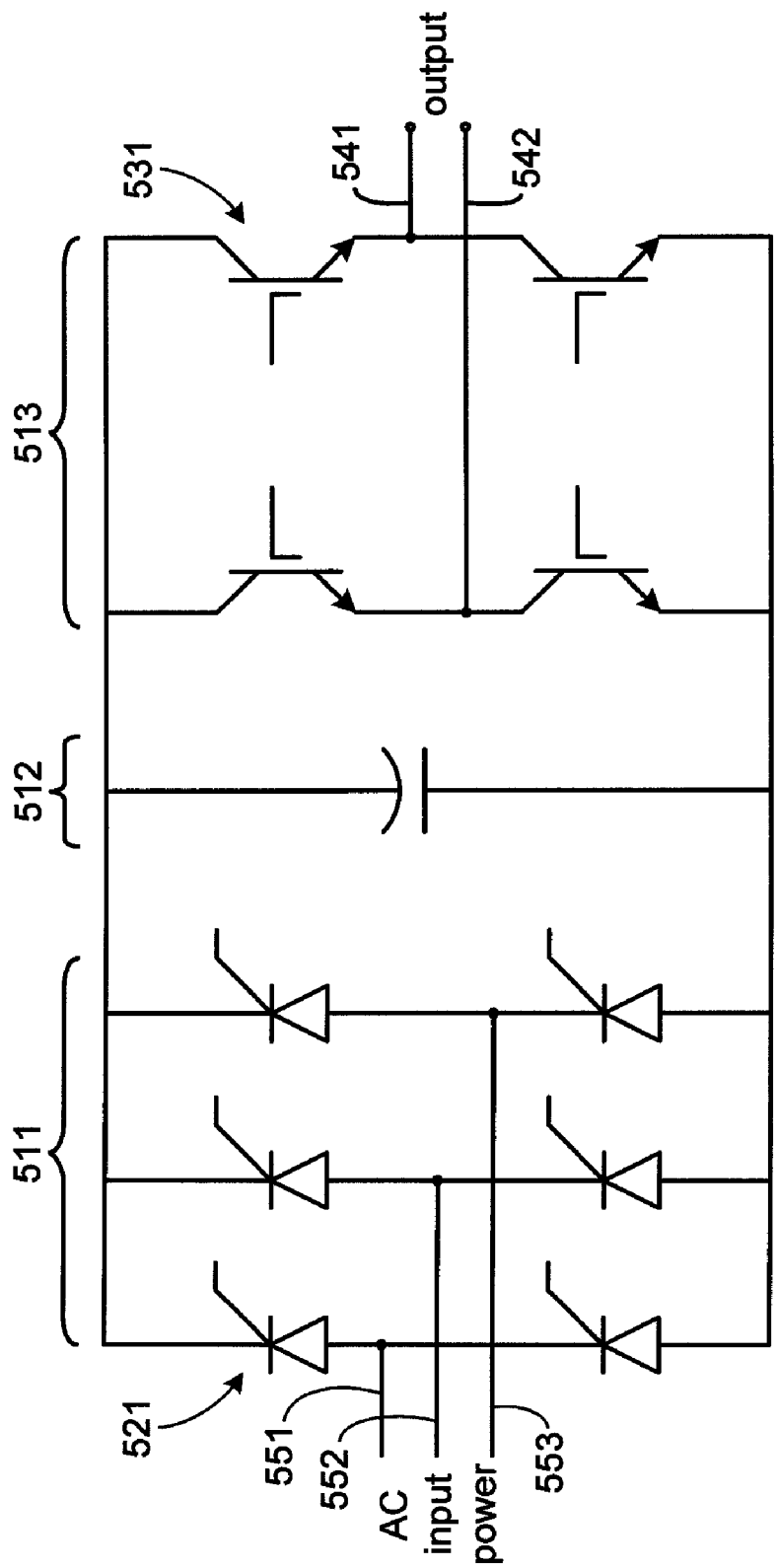
FIG. 5 is a diagram illustrating the structure of a single one of the power modules in the variable speed drive of FIG. 3.

Referring to FIG. 5, a diagram illustrating the structure of a single one of the power modules (e.g., 321) is shown. Each power module includes a converter section 511, a capacitor bank 512 and an inverter section 513. Converter section 511 includes three pairs of silicon controlled rectifiers (e.g., 521) that are turned on ("fired") at appropriate times to allow the three-phase AC voltage received from a power source via input power lines 551-553 to charge capacitor bank 512. Inverter section 513 includes four switches (e.g., 531) which are turned on and off at appropriate times to generate a PWM waveform with the desired duty cycle (i.e., the duty cycle of a desired sine wave.) The switches are turned on and off to alternately connect output lines 541 and 542 to opposite sides of capacitor bank 512. The output waveform of the power module therefore ranges from +v to −v, where v is the voltage across the capacitor bank. (It should be noted that the control circuitry that fires the silicon controlled rectifiers and turns the switches on and off is well known in the art and will not be explained in detail here.)

Each of the power modules in this embodiment is identical. Each power module receives an isolated three-phase AC signal from the power source as indicated in FIG. 5 (the power inputs have been omitted from FIG. 3 for purposes of clarity.) Each power module also receives essentially the same control signals that drive the silicon controlled rectifiers of the respective converter sections, as well as essentially the same control signals that drive the switches of the respective inverter sections. This may simplify the control system for the entire variable speed drive. It should be noted that, while identical control signals may be provided to the power modules in one embodiment, alternative embodiments may have separate controls for the different power modules in order to allow greater control of the power modules. For instance, it may be desirable to control the power modules separately in order to allow each phase of the output to be separately controlled and to allow the output current of the drive to be balanced.

As noted above, each power module may produce a PWM waveform. For instance, the voltage measured between nodes 351 and 352 of power module 321 may be represented by the PWM waveform shown in FIG. 2A. This waveform may, for example, have a magnitude of 2000 V. When this waveform is filtered, for instance, by an LC filter as shown in FIG. 4C, the high-frequency components are removed (or at least substantially reduced) and the sine wave shown in FIG. 2B remains. Each power module-filter pair produces substantially the same filtered waveform. The voltage produced between nodes 351 and 356 is the sum of these waveforms—a sine wave with a magnitude that is 4 times the magnitude of a single power module's filtered waveform (e.g., 8000 V.)

The present system has a number of advantages over prior art systems. As noted above, by filtering the high-frequency components out of the drive's output, noise in the signal is substantially reduced. Consequently, noise-related stresses and inefficiencies are reduced. Further, by reducing the rate at which the drive's output voltage changes, the overshoot of the voltage at the pump matter is reduced and consequently the peak voltages which are experienced by the motor are reduced, so there is less stress on the motor. Still further, because the filtering in the present system is performed on the output of each individual power module, the filters only need to handle a fraction of the output voltage that is handled by conventional filters that are implemented only at the output of the drive (e.g., 2000 V instead of 8000 V.) The filters therefore experience less stress and may be less expensive.

It should be noted that alternative embodiments of the system may include many variations of the features described above. For instance, while the system of FIG. 3 is configured to add the outputs of four power modules for each phase, other embodiments may use more or fewer power modules. Further, although a simple inductors or LC filters may be used to filter the PWM output waveform of each power module, other types of filters can also be used. Still further, alternative embodiments may use power modules that have structures other than the specific design illustrated in FIG. 5, and that may generate more complex (e.g., stepped) output waveforms. Still other variations will be apparent to those of skill in the art of the invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many varia-

What is claimed is:

1. An electrical drive system configured to power an electrical submersible pump motor, the drive system comprising:
a plurality of power modules, wherein each of the power modules is configured to receive an input power signal and to provide an output power signal; and
a plurality of filters, wherein each of the filters is coupled to an output of a corresponding one of the power modules;
wherein at least two of the power modules are coupled together in a configuration in which the output power signals provided by the at least two power modules are added to produce an output drive signal at an output of the drive system; and
wherein the filter corresponding to each of the at least two power modules is configured to remove at least a portion of high-frequency components of the corresponding output power signal before the output power signal is added to the output power signals of the remainder of the at least two power modules.

2. The electrical drive system of claim 1, wherein the plurality of power modules comprise three separate sets, wherein each set of power modules produces a corresponding output signal that has a unique phase, and wherein the output signals of the three sets of power modules are combined to produce a three-phase output drive signal at the output of the drive system.

3. The electrical drive system of claim 2, wherein the output signal produced by each set of power modules is substantially sinusoidal.

4. The electrical drive system of claim 1, wherein the filter coupled to each power module comprises an inductor coupled in series with the power module.

5. The electrical drive system of claim 1, wherein the filter coupled to each power module comprises an LC filter coupled to the output of the power module.

6. The electrical drive system of claim 1, wherein each module receives a corresponding three-phase input signal, rectifies the three-phase input signal to produce a DC signal that charges a capacitor bank, and then draws power from the capacitor bank to produce the corresponding output power signal.

7. The electrical drive system of claim 1, wherein the output power signal produced by each power module comprises a pulse width modulated (PWM) signal.

8. The electrical drive system of claim 1, wherein each power module comprises a converter section, a capacitor bank an inverter section.

9. The electrical drive system of claim 1, wherein the output drive signal at the output of the drive system is substantially sinusoidal.

10. The electrical drive system of claim 9, wherein the output drive signal at the output of the drive system comprises a three-phase signal wherein each phase is substantially sinusoidal.

11. A system for pumping fluids from a well, the system comprising:
the electrical drive system of claim 1;
an electric submersible pump positioned in the well;
an interconnect coupled between the electrical drive system and the electric submersible pump and configured to convey the output drive signal from the output of the drive system to a motor of the electric submersible pump.

12. A method for producing a high-voltage drive output signal for an electrical submersible pump motor, the method comprising:
providing a plurality of intermediate-voltage drive signals;
individually filtering each of the intermediate-voltage drive signals to remove at least a portion of high-frequency components in the intermediate-voltage drive signals; and
adding the filtered intermediate-voltage drive signals to produce the high-voltage drive output signal.

13. The method of claim 12, wherein a first set of the intermediate-voltage drive signals are added to produce a signal having a first unique phase, a second set of the intermediate-voltage drive signals are added to produce a signal having a second unique phase, and a third set of the intermediate-voltage drive signals are added to produce a signal having a third unique phase, and wherein the signals having the first, second and third unique phases are added to produce a three-phase signal as the high-voltage drive output signal.

14. The method of claim 13, wherein each of the signals having the first, second and third unique phases is substantially sinusoidal.

15. The method of claim 12, wherein individually filtering each of the intermediate-voltage drive signals comprises passing each intermediate-voltage drive signal through an inductor.

16. The method of claim 12, wherein individually filtering each of the intermediate-voltage drive signals comprises passing each intermediate-voltage drive signal through an LC filter.

17. The method of claim 12, wherein providing each of the plurality of intermediate-voltage drive signals comprises receiving a corresponding three-phase input signal, rectifying the three-phase input signal to produce a DC signal that charges a capacitor bank, and then drawing power from the capacitor bank to produce the corresponding intermediate-voltage drive signal.

18. The method of claim 12, wherein the plurality of intermediate-voltage drive signals comprise a pulse width modulated (PWM) signals.

19. The method of claim 12, wherein the output drive signal at the output of the drive system is substantially sinusoidal.

20. The method of claim 19, wherein the output drive signal at the output of the drive system comprises a three-phase signal wherein each phase is substantially sinusoidal.

* * * * *